United States Patent
Ichihashi et al.

(10) Patent No.: US 9,955,633 B2
(45) Date of Patent: May 1, 2018

(54) SYSTEM FOR SELECTIVE IRRADIATION WITH CIRCULARLY POLARIZED LIGHT

(71) Applicant: FUJIFILM Corporation, Tokyo (JP)

(72) Inventors: Mitsuyoshi Ichihashi, Ashigarakami-gun (JP); Yoshihisa Usami, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 84 days.

(21) Appl. No.: 14/554,305

(22) Filed: Nov. 26, 2014

(65) Prior Publication Data

US 2015/0075069 A1   Mar. 19, 2015

Related U.S. Application Data

(63) Continuation of application No. PCT/JP2013/064581, filed on May 27, 2013.

(30) Foreign Application Priority Data

May 28, 2012   (JP) .................. 2012-120446

(51) Int. Cl.
   *A01G 9/20*   (2006.01)
   *F21V 9/14*   (2006.01)
   (Continued)

(52) U.S. Cl.
   CPC .............. *A01G 9/14* (2013.01); *A01G 1/001* (2013.01); *A01G 7/045* (2013.01); *F21V 9/14* (2013.01);
   (Continued)

(58) Field of Classification Search
   CPC .......... A01G 9/14; A01G 1/001; A01G 7/045; F21V 9/14
   See application file for complete search history.

(56) References Cited

U.S. PATENT DOCUMENTS 5,323,567 A   6/1994 Nakayama et al.
7,738,170 B2   6/2010 Moriya
(Continued)

FOREIGN PATENT DOCUMENTS

CN   101449197 A   6/2009
EP   1 498 751 A1   1/2005
(Continued)

OTHER PUBLICATIONS

Extended European Search Report dated Dec. 22, 2015 from the European Patent Office in counterpart EP Application No. 13796940.8.
(Continued)

*Primary Examiner* — Anh Mai
*Assistant Examiner* — Nathaniel Lee
(74) *Attorney, Agent, or Firm* — Sughrue Mion, PLLC

(57) ABSTRACT

According to the present invention, provided is a system for irradiating a target object selectively with specific circularly polarized light, comprising a polarization-state control member that controls the polarization state of light to thereby generate circularly polarized light; and a circularly polarized light-reflecting member, wherein the circularly polarized light-reflecting member is disposed at a position on which the circularly polarized light emitted from the polarization-state control member can be incident; the circularly polarized light-reflecting member generates reflected light that selectively comprises circularly polarized light of the same sense as the incident circularly polarized light from the polarization-state control member; and the circularly polarized light-reflecting member is disposed such that the target object can be irradiated with at least a part of the reflected light.

20 Claims, 2 Drawing Sheets

(51) Int. Cl.
    *A01G 9/14*     (2006.01)
    *A01G 7/04*     (2006.01)
    *A01G 1/00*     (2006.01)
    *G02B 27/28*     (2006.01)
    *F21Y 115/10*     (2016.01)

(52) U.S. Cl.
    CPC ......... *G02B 27/286* (2013.01); *F21Y 2115/10* (2016.08); *Y02P 60/146* (2015.11)

(56) References Cited

U.S. PATENT DOCUMENTS

| | | | |
|---|---|---|---|
| 2003/0071937 A1 | 4/2003 | Li et al. | |
| 2006/0103928 A1 | 5/2006 | Moriya | |
| 2009/0168394 A1* | 7/2009 | Hikmet | F21S 48/114 362/19 |
| 2011/0115385 A1* | 5/2011 | Waumans | A01G 7/045 315/152 |

FOREIGN PATENT DOCUMENTS

| | | |
|---|---|---|
| EP | 2 323 472 A1 | 5/2011 |
| JP | 62-055029 A | 3/1987 |
| JP | 62-155026 A | 7/1987 |
| JP | 7-050941 A | 2/1995 |
| JP | 2006-145749 A | 6/2006 |
| JP | 2008-118957 A | 5/2008 |
| JP | 2008-228688 A | 10/2008 |
| WO | 2007/113768 A2 | 10/2007 |
| WO | 2010/004489 A1 | 1/2010 |

OTHER PUBLICATIONS

Office Action dated Nov. 10, 2015, from the Japanese Patent Office in counterpart Japanese Application No. 2012-120446.
Office Action dated Oct. 10, 2015 from the State Intellectual Property Office of the People's Republic of China in counterpart Chinese Application No. 201380027728.7.
Pavel P. Shibayev et al., "The Effect of Circularly Polarized Light on the Growth of Plants", International Journal of Botany 2011, pp. 113-117, vol. 7, Issue 1.
International Search Report for PCT/JP2013/064581 dated Aug. 27, 2013.
Office Action dated Jan. 6, 2016 from the Korean Intellectual Property Office in counterpart Korean Application No. 10-2014-7034805.
Office Action dated Mar. 1, 2016, from the State Intellectual Property Office of People's Republic of China in counterpart Chinese Application No. 201380027728.7.
Office Action dated Feb. 28, 2017, from the State Intellectual Property Office of People's Republic of China in counterpart Chinese Application No. 201380027728.7.
Office Action dated Sep. 5, 2017, issued by the State Intellectual Property Office of the People's Republic of China in counterpart Chinese Application No. 201380027728.7.
Office Action dated Jan. 6, 2017, from the Taiwanese Patent Office in corresponding Taiwanese Application No. 102118451.
Office Action dated Aug. 4, 2017, from the European Patent Office in counterpart European Application No. 13796940.8.
Communication dated Dec. 16, 2016 from the European Patent Office in counterpart European Application No. 13 796 940.8.
International Preliminary Report on Patentability dated Dec. 11, 2014 from the International Bureau in counterpart Application No. PCT/JP2013/064581.

* cited by examiner

SYSTEM FOR SELECTIVE IRRADIATION WITH CIRCULARLY POLARIZED LIGHT

CROSS-REFERENCE TO RELATED APPLICATIONS

This application is a continuation of PCT International Patent Application No. PCT/JP2013/064581, filed on May 27, 2013, which claims priority under 35 U.S.C. § 119 (a) to Japanese Patent Application No. 2012-120446 filed on May 28, 2012, the entire contents of both of which are incorporated herein by reference.

BACKGROUND OF THE INVENTION

Field of the Invention

The present invention relates to a system for selectively irradiating a target object with specific circularly polarized light.

Description of the Related Art

Circumstances in which selective irradiation with specific circularly polarized light is performed can be expected to give a specific effect on the growth or photochemical reaction of a plant. For example, in Patent Literature 1, it is shown that the growth of *Arabidopsis* was accelerated by irradiation only with right-circularly polarized light through the use of an apparatus for controlling organism behavior provided with a polarized light irradiation mechanism.

However, in experiments by the present inventors, there were examples of plant cultivation in which, even when irradiation of a plant with specific circularly polarized light was performed, the difference in the growth by the circularly polarized light was not observed with good reproducibility.

CITATION LIST

Patent Literature

[Patent Literature 1] Japanese Patent Application Laid-Open No. 2008-228688

SUMMARY OF THE INVENTION

An object of the present invention is to provide a system for selectively irradiating a target object with specific circularly polarized light. In more detail, an object of the present invention is to provide a system having high energy efficiency and a high circular polarization degree of light with which a target object is irradiated as a system for irradiating a target object selectively with specific circularly polarized light.

As the cause why the effect of circularly polarized light can not be obtained sufficiently, the present inventors have focused on the possibility of the inversion of sense or depolarization of circularly polarized light due to reflection in addition to scattering of light, and conducted a research on a system capable of reutilizing circularly polarized light with which a target object has been directly irradiated from a light source and thus have completed the present invention. Namely, the present invention provides (1)-(13) below.

(1) A system for irradiating a target object selectively with specific circularly polarized light, including a polarization-state control member that controls the polarization state of light to thereby generate circularly polarized light, and a circularly polarized light-reflecting member, wherein the circularly polarized light-reflecting member is disposed at a position on which the circularly polarized light emitted from the polarization-state control member can be incident; the circularly polarized light-reflecting member generates reflected light that selectively includes circularly polarized light of the same sense as the incident circularly polarized light from the polarization-state control member; and the circularly polarized light-reflecting member is disposed such that the target object can be irradiated with at least a part of the reflected light.

(2) The system according to (1) used as a structure, wherein the structure includes a space containing the polarization-state control member and the circularly polarized light-reflecting member; the space is formed by faces having the circularly polarized light-reflecting member at least in part; and 10% or more of the area of the faces forming the space has the circularly polarized light-reflecting member.

(3) The system according to (2), including the circularly polarized light-reflecting member in 50% or more of the area of the faces forming the space.

(4) The system according to any one of (1) to (3), wherein the circularly polarized light-reflecting member is disposed at a position on which the circularly polarized light produced by passing through the polarization-state control member can be incident.

(5) The system according to any one of (1) to (4), wherein the polarization-state control member includes a linearly-polarizing plate and a quarter wave plate ($\lambda/4$ wavelength plate).

(6) The system according to any one of (1) to (4), wherein the polarization-state control member includes a layer having a helical molecular arrangement structure.

(7) The system according to any one of (1) to (6), wherein the circularly polarized light-reflecting member includes a layer having a helical molecular arrangement structure.

(8) The system according to any one of (1) to (7), wherein the target object is a plant.

(9) The system according to any one of (1) to (8), wherein the system has a light source; and the polarization-state control member controls the polarization state of light generated from the light source to thereby produce circularly polarized light.

(10) The system according to any one of (1) to (8) used as a plant factory, wherein the plant factory includes a space formed by a wall face, a ceiling and a floor, and includes the polarization-state control member and the circularly polarized light-reflecting member inside the space; and 10% or more of the total area of the wall face, the ceiling and the floor is the circularly polarized light-reflecting member.

(11) The system according to (9) used as a plant factory, wherein the plant factory includes a shelf of 2 or more stages; in at least one stage of the shelf, the light source, the polarization-state control member and the circularly polarized light-reflecting member are included in a space between a bottom face and a bottom face of an upper stage; and 10% or more of the total area of either one or more faces on the space side selected from the bottom face and the bottom face of an upper stage is the circularly polarized light-reflecting member.

(12) A circularly polarized light-reflecting member for use in the system according to any one of (1) to (11), the circularly polarized light-reflecting member including a layer having a helical molecular arrangement structure.

(13) A method for cultivating a plant using the system according to any one of (1) to (11).

Effect of the Invention

The present invention provides a system having high energy efficiency and also a high circular polarization degree of light with which a target object is irradiated, as a system for selectively irradiating a target object with specific circularly polarized light.

MODES OF CARRYING OUT THE INVENTION

Figure 1:
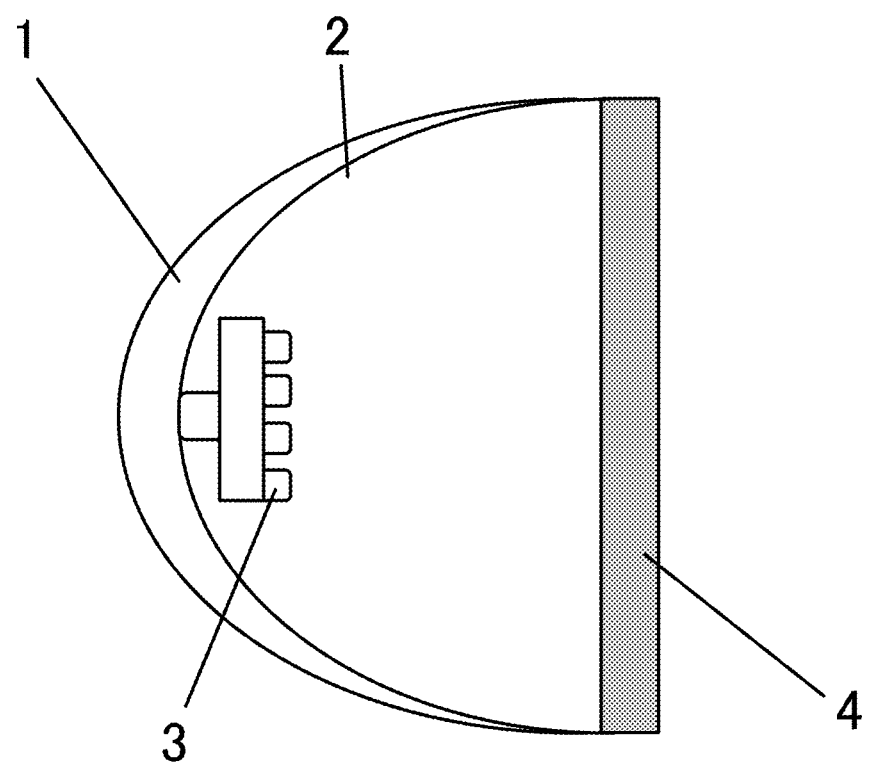
FIG. 1 is a schematic view showing one example of a lighting device.

Hereinafter, the present invention will be explained in detail.

In the present description, "to" is used in such a meaning that numerical values described before and after thereof are included as the lower limit and the upper limit.

The system of the present invention includes a polarization-state control member and a circularly polarized light-reflecting member. In the system of the present invention, the circularly polarized light-reflecting member is disposed at a position on which the circularly polarized light emitted from the polarization-state control member can be incident. In the system of the present invention, a target object applied to the system of the present invention receives circularly polarized light that is generated from the polarization-state control member and can also receive circularly polarized light of the same sense as that of the above circularly polarized light as a reflected light from the circularly polarized light-reflecting member.

Here, the sense of circularly polarized light means right-circularly polarized light or left-circularly polarized light. The sense of circularly polarized light is defined such that, when light is viewed as it proceeds toward an observer and in the case where the tip of the electric field vector rotates clockwise with the increase in time, the sense is right-circularly polarized light, and in the case where it rotates counterclockwise, the sense is left-circularly polarized light.

In the present description, when referred to as "selectively irradiate" for circularly polarized light, it means that light quantity of either the right-circularly polarized light component or the left-circularly polarized light component of irradiation light is larger than the other circularly polarized light component. Specifically, when referred to as "selective," the circular polarization degree of light is preferably 0.3 or more, more preferably 0.6 or more, further more preferably 0.8 or more. Substantially, the circular polarization degree is preferably 1.0. When the degree of the circularly polarized light is less than 0.3, an effect such as a plant growth control effect, which is expected to be obtained by specific circularly polarized light, may not appear. The definition of "circular polarization degree" will be described later. Further, in the present description, there is a case of describing circularly polarized light as "specific circularly polarized light" to thereby show in particular "either of right-circularly polarized light or left-circularly polarized light."

The wavelength of circularly polarized light with which a target object is selectively irradiated by the system of the present invention is not particularly limited, unless otherwise referred to. For example, irradiation with circularly polarized light may be selectively performed in at least a part of wavelengths of 10 nm to 2000 nm, preferably in at least a part of wavelengths of visible light. The wavelength may be, for example, a wavelength region such as 300 nm to 700 nm, or a specific wavelength such as 460 nm, 550 nm or 660 nm. Typically, the wavelength may be determined according to a control wavelength region of a lighting device of the system of the present invention.

In the system of the present invention, a target object can receive, in addition to circularly polarized light from the lighting device, for example, circularly polarized light by reflected light from the circularly polarized light-reflecting member, from one or more directions selected from directions of 10°, 20°, 30°, 40°, 50°, 60°, 70°, 80°, 90°, 100°, 110°, 120°, 130°, 140°, 150°, 160°, 170° or 180° when setting the incident direction of the circularly polarized light from the lighting device as 0°. Circularly polarized light from a plurality of directions may be received on a circular cone side face represented by each of above-described angles or on a flat plane. For example, the system can be arranged such that irradiation with circularly polarized light from two or more directions different from each other by, for example, 30° or more, 40° or more, 50° or more, 60° or more, 70° or more, 80° or more, or 90° or more can be performed based on the target object, on, for example, a flat plane at 90° when the incident direction of circularly polarized light from the lighting device is set as 0° (a flat plane including a target object having an incident direction of circularly polarized light from the lighting device as the normal line direction). For example, the circularly polarized light-reflecting member may be disposed such that a target object can receive circularly polarized light caused by reflected light from 3, 4 or 5 directions.

In the system of the present invention, the circularly polarized light-reflecting member may be provided, for example, such that circularly polarized light is reflected in the space including a lighting device constituted of a light source and a polarization-state control member, and a target object, to thereby make it possible to irradiate the target object with the reflected light from a plurality of directions as described above.

For example, the system of the present invention can be used as a structure of a plant cultivation factory, a plastic greenhouse, a box, and the like. In this case, it is sufficient that a space including a lighting device constituted of a light source and the polarization-state control member, and a target object may be formed by a wall (side face), a ceiling (upper face), a floor (bottom face) or the like. The space may be one formed by including an insubstantial face such as an inside space of a box having no cover.

The circularly polarized light-reflecting member may be arranged in at least a part of the inside surface of the structure. When the circularly polarized light-reflecting member is provided in a part of the inside surface of the structure, the area of the member may be, for example, 1% or more, 5% or more, 10% or more, 50% or more, 70% or more or 90% or more relative to the area of the whole inside surface, and may be 95% or less, 90% or less, 70% or less, 50% or less, 30% or less or 10% or less. Furthermore, when the area of the member is provided in a part, parts other than the part in which the circularly polarized light-reflecting member is disposed is preferably painted in black or covered with a member having low reflection, because the inversion of sense of circularly polarized light or depolarization of polarized light due to reflection from portions other than the circularly polarized light-reflecting member is to be avoided. The inside surface of the structure may be flat or curved. Examples of the inside surface of the structure include a wall (side face), a ceiling and a floor of a plastic greenhouse, and a side face, an upper face and a surface of a bottom face of a box. In these example, the circularly polarized light-reflecting member may be disposed on one or more of a wall (side face), a ceiling (upper face) and a floor (bottom face), or on a part of any one or more of them. The circularly polarized light-reflecting member may be disposed on each of a wall (side face), a ceiling (upper face) and a floor (bottom face).

In addition, for example, the system of the present invention can be used as a structure such as a shelf having 2 or more stages. In this case, it is possible to consider that a space including a lighting device constituted of a light source and a polarization-state control member, and a target object is formed from a bottom face, a bottom face of the upper stage of the shelf and a side face (which may be a virtual side face that is not provided as a member) linking the bottom face and the bottom face of the upper stage of the shelf in each of stages of the shelf. The lighting device and the circularly polarized light-reflecting member may be provided, for example, on the bottom face or the bottom face of the upper stage (the back side thereof).

Furthermore, for example, the system of the present invention can be used as a structure of a petri dish, a beaker and the like. In this case, at least a part of the wall face and/or the bottom face of the petri dish, the beaker and the like may be formed into a circularly polarized light-reflecting member such that the circularly polarized light-reflecting member reflects circularly polarized light in the space including a target object in the petri dish or the beaker and a lighting device.

<Target Object>

Examples of the target object that can be applied to the system of the present invention include, with no particular limitation, those that cause a reaction or change by light irradiation, such as living things, plants, vegetables, fruits, bacilli, fungi, mushroom-growing logs, hands, foods, liquor, seasonings, human bodies, chemical synthesis systems (optical organic synthesis, optical reaction, optical resolution or the like).

<Lighting Device>

The system of the present invention preferably includes, a light source, and the light source and the polarization-state control member may be integrated to thereby form a lighting device. In the present description, the combination of a light source and a polarization-state control member may be referred to as a lighting device. Furthermore, when a light source and a polarization-state control member are not integrated in the system of the present invention in a case of utilizing sunlight, the polarization-state control member may substantially function as a lighting device.

In the system of the present invention, the number of the lighting device may be one, or two or more. The suitable number of the devices can be selected appropriately corresponding to the size of the system, the output of a light source to be used, the emission spectrum of the light source and necessary lighting intensity. Moreover, by placing the lighting device in plural number for the side face and/or floor face, in addition to the ceiling, the target object can be evenly irradiated with the specific circularly polarized light.

Figure 2:
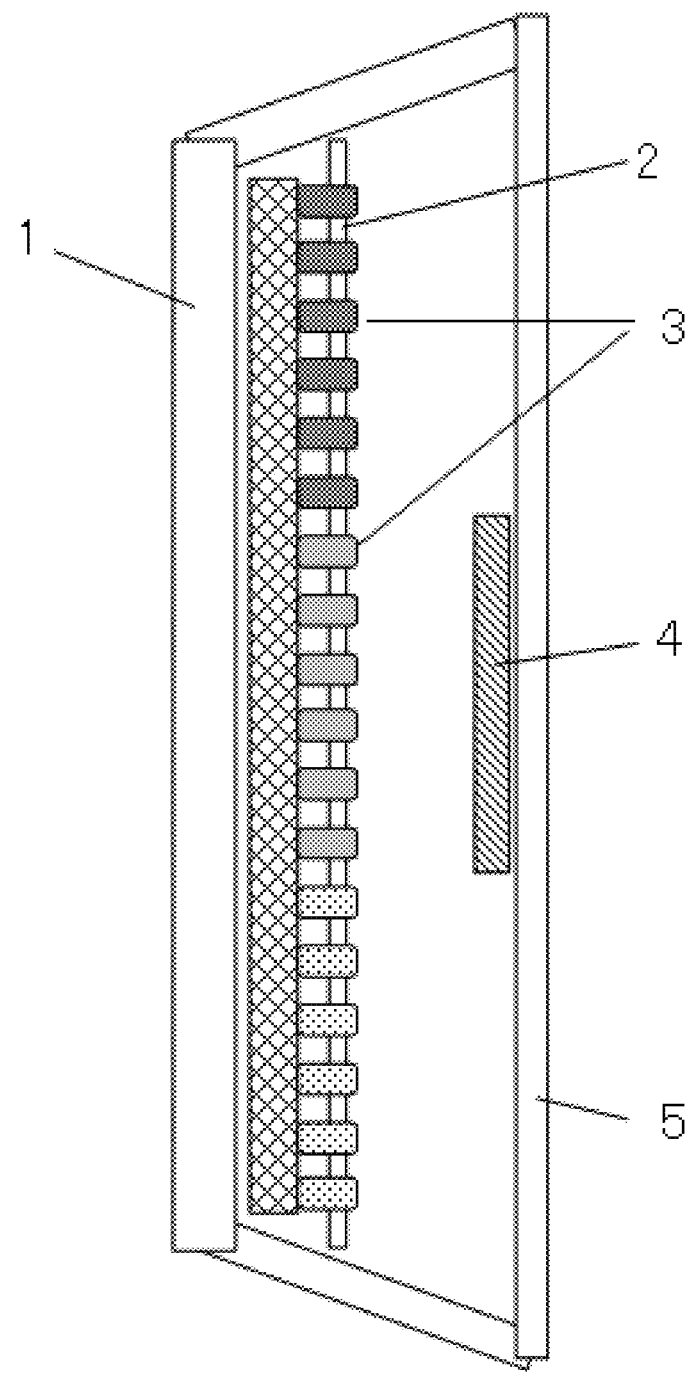
FIG. 2 is a cross-sectional view showing another example of a lighting device.

The basic configuration of an example of a lighting device having a light source is shown in FIGS. 1 and 2.

FIG. 1 shows a lighting device in which a sheet-like polarization-state control member 4 is disposed at an opening of a reflective housing 1 holding an emission light source 3.

In addition, FIG. 2 shows a lighting device including the emission light source 3 provided with a plurality of unit light sources having different emission wavelengths one another, and the sheet-like polarization-state control member 4 disposed in a part of the device. The lighting device in FIG. 2 has advantages that the use of a known circularly polarized light plate becomes possible and the use amount of the member can be reduced.

Meanwhile, in FIGS. 1 and 2, 2 represents a reflection face (reflection film) and 5 represents a protective plate.

In the lighting device in the system of the present invention, the polarization state in the wavelength region of a part of wavelengths of light from the light source is changed into circularly polarized light. The circular polarization degree in a control wavelength band among irradiation light is preferably 0.3 or more.

Here, "a part of wavelengths" means 20% or more, preferably 20% or more to 80% or less of the wavelength region.

The circular polarization degree of light in the control wavelength band among the irradiation light is preferably 0.3 or more, more preferably 0.6 or more, further more preferably 0.8 or more.

Here, a polarized state of light can be represented by the sum of right-circularly polarized light and left-circularly polarized light. For example, when intensities of right- and left-circularly polarized light components are equal to each other, the sum thereof results in linearly polarized light, and the electric vector thereof vibrates in the direction determined by the phase difference between the left-circularly polarized light and right-circularly polarized light. When intensities of a right-circularly polarized light component and a left-circularly polarized light component are different from each other, the sum results in elliptically polarized light, and when either component alone exists, the sum results in complete circularly polarized light.

Here, when denoting the intensity of a right-circularly polarized light component of light by $I_R$ and the intensity of a left-circularly polarized light component of the light by $I_L$, $|I_R-I_L|/(I_R+I_L)$ is defined as the circular polarization degree.

The polarization state at respective wavelengths of light emitted from a light source can be measured using a spectral radiance meter or a spectrometer mounted with a circularly-polarizing plate. In this case, the intensity of light measured through a right-circularly-polarizing plate corresponds to $I_R$, and the intensity of light measured through a left-circularly-polarizing plate corresponds to $I_L$. Furthermore, ordinary light sources such as an incandescent light bulb, a mercury lamp, a fluorescent lamp and LED emit approximate natural light, and properties of producing polarized light of the polarization-state control member when being mounted on these can be measured, for example, by using a polarized light phase difference-analyzing apparatus "AxoScan" manufactured by Axometrics, Inc., etc.

(Other Members)

The lighting device may further have, as necessary, other members such as a reflection member, a heat release member, an infrared ray absorption member, an ultraviolet ray absorption member, a lens and a prism.

<Light Source>

The light source is not particularly limited and can be selected appropriately in accordance with the purpose. Examples thereof include discharge lamps such as a fluorescent lamp, an LED and a mercury lamp; a tungsten lamp; a leaser light; an organic light-emitting diode (OLED) lamp; a cold cathode tube; a halogen lamp; a mercury lamp; an incandescent lamp; a discharge tube; a metal halide lamp; a xenon lamp and the like. Among these, the LED is particularly preferable from the viewpoint of efficiency.

Light of a wavelength obtained by emission and the like may be used as it is, or light converted by a fluorescent substance may be used.

When light is to be used for the growth control of a plant, the use of an LED that emits light of a wavelength giving a high efficiency to the cultivation of a plant is preferable. Specifically, the use of a light source having high energy at either wavelength of near 460 nm or near 660 nm, or at both wavelengths is preferable.

Furthermore, in the system of the present invention, natural light such as solar light may be utilized in place of a light source. In this case, the polarization-state control member may be applied to a widow for taking in the natural light or to the surface of the window. Alternatively, solar light may be utilized by using a system of a form in which the circularly polarized light-reflecting member serves also as the polarization-state control member, and by disposing the circularly polarized light-reflecting member at an angle at which reflected light from a part thereof enters the other portion of the circularly polarized light-reflecting member. In the system of the present invention utilizing solar light as a light source, light quantity can be positively reduced and a target object can be selectively irradiated with specific circularly polarized light, by, for example, setting a plant or fungi for which growth under circumstances of weak light is necessary, as a target object. Moreover, a configuration of a system in which the side face of a plant or the back face of a leaf can be irradiated with light by adjusting the disposition location of the circularly polarized light-reflecting member, is also possible.

<Polarization-State Control Member>

The polarization-state control member is a member that controls the polarization state of light from a light source or the like.

Here, "to control the polarization state of light" means to control the difference between the polarization state of light immediately after being emitted from a light source or sunlight and the polarization state of light having passed through the polarization-state control member or having been reflected.

At least one control wavelength bandwidth of the polarization-state control member is preferably from 60 nm or more to 250 nm or less, more preferably 80 nm 200 nm. When the control wavelength bandwidth is less than 60 nm, the growth control effect of a plant, which is targeted, may not appear, and when the wavelength exceeds 250 nm, a plurality of growth control effects may overlap to thereby cancel the effects.

Here, the control wavelength bandwidth can be measured, for example, by a polarized light phase difference-analyzing apparatus "AxoScan" manufactured by Axometrics, etc.

The polarization-state control member is not particularly limited, and can be appropriately selected in accordance with a purpose, and examples of these include a polarizing plate, a circularly-polarizing plate, a circularly polarizing reflection plate, etc. Among these, from the viewpoint of a growth control effect of a plant and a utilization efficiency of light, the circularly polarizing reflection plate is particularly preferable.

Furthermore, the polarization-state control member may function as the circularly polarized light-reflecting member, or the polarization-state control member may be a member that is same as the circularly polarized light-reflecting member.

The polarization-state control member is preferably removable and exchangeable.

<<Circularly-Polarizing Plate>>

The circularly-polarizing plate includes a retardation plate and a polarizing plate, and, specifically, includes a linearly-polarizing plate and a quarter wave plate. When the circularly-polarizing plate is used as the polarization-state control member, the wavelength selectivity in a polarization state can be controlled by the selection of the wavelength of a polarization state by using a quarter wave plate to be described later, or by using a polarizing plate having absorption dichroism of linearly polarized light in a part of an emission wavelength region.

—Linearly-Polarizing Plate—

A linearly-polarizing plate is a member that lets a specific linearly polarized light pass through, and absorbs linearly polarized light that is orthogonal to the specific linearly polarized light, among the light going through the member.

The linearly-polarizing plate includes at least a polarizing layer, and a base material and, additionally, other layers as necessary.

——Polarizing Layer——

The polarizing layer contains at least a polarizing element, and contains a binder resin, and additionally, other components as necessary.

Examples of the polarizing element include iodine, dichromic dye, anisotropic metal nano particles, a carbon nano tube, metal complexes and the like.

The binder resin is not particularly limited, and can be appropriately selected in accordance with the purpose, and examples thereof include polyvinyl alcohol, polymethacrylic acid, polyacrylic acid, polyethylene terephthalate, polyvinyl butyral, polymethyl methacrylate, polyvinyl formal, polycarbonate, cellulose butyrate, polystyrene, polyvinyl chloride, polyvinylidene chloride, polyethylene adipamide, polyvinyl acetate, copolymers thereof (such as vinyl chloride—vinyl acetate copolymer, styrene—methyl methacrylate copolymer), etc. These may be used alone, or in combination of two or more kinds thereof.

The thickness of the polarizing layer is not particularly limited and can be appropriately selected in accordance with the purpose, and is preferably 10 µm to 300 µm.

——Base Material——

The shape, structure, size etc. of the base material are not particularly limited and can be appropriately selected in accordance with the purpose, and examples of the shape include a flat plate-like shape, a sheet-like shape and the like. The structure may have, for example, a single layer structure or a laminated structure, which can be appropriately selected.

The material of the base material is not particularly limited, and both an inorganic material and an organic material can be suitably used.

Examples of the inorganic material include glass, quartz, silicon and the like.

Examples of the organic material include acetate-based resins such as triacetyl cellulose (TAC); polyester-based resins, polyethersulfone-based resins, polysulfone-based resins, polycarbonate-based resins, polyamide-based resins, polyimide-based resins, polyolefin-based resins, acrylic-based resins, polynorbornene-based resins, cellulose, polyarylate-based resins, polystyrene-based resins, polyvinyl alcohol-based resins, polyvinyl chloride-based resins, polyvinylidene chloride-based resins, and the like. They may be used alone, or may be used in combination of two or more kinds thereof.

The base material may be one that has appropriately been synthesized, or a commercially available product may be used as the base material.

The thickness of the base material is not particularly limited and can be appropriately selected in accordance with the purpose, and is preferably 10 µm to 2,000 µM, more preferably 50 µm to 500 µm.

The polarizing plate can be manufactured by stretching, in a definite direction, an applied film obtained by applying an application liquid containing a polarizing element and a binder resin onto the base material and drying the same.

—Quarter Wave Plate—

The quarter wave plate is not particularly limited and can be appropriately selected in accordance with the purpose, and examples of these include a stretched polycarbonate film, a stretched norbornene-based polymer film, a transparent film aligned while containing an inorganic particle having birefringence such as strontium carbonate, a thin film obtained by obliquely depositing an inorganic dielectric substance on a support, and the like.

Examples of the quarter wave plate include (1) a retardation plate obtained by laminating a birefringent film having large retardation and a birefringent film having small retardation such that optical axes thereof cross at right angle as described in Japanese Patent Application Laid-Open No. 5-27118 or 5-27119, (2) a retardation plate obtained by laminating a polymer film that gives $\lambda/4$ wavelength at a specific wavelength and a polymer film that is constituted of the same material and that gives $\lambda/2$ wavelength at the same wavelength to thereby give $\lambda/4$ wavelength in a wide wavelength region as described in Japanese Patent Application Laid-Open No. 10-68816, (2) a retardation plate capable of achieving $\lambda/4$ wavelength in a wide wavelength region by laminating two polymer films as described in Japanese Patent Application Laid-Open No. 10-90521, (3) a retardation plate that is capable of achieving $\lambda/4$ wavelength in a wide wavelength region and that uses a modified polycarbonate film as described in International Publication No. 00/26705 pamphlet, (4) a retardation plate that is capable of achieving $\lambda/4$ wavelength in a wide wavelength region and that uses a cellulose acetate film as described in International Publication No. 00/65384 pamphlet, and the like.

As such a quarter wave plate, a commercially available product can be used, and for example, trade name "Pureace WR" (manufactured by Teijin Limited) and the like are included.

The circularly-polarizing plate includes the linearly-polarizing plate and the quarter wave plate, and is constituted by pasting these plates such that the angle of the optical axis of the quarter wave plate relative to the polarized light absorption axis of the linearly-polarizing plate becomes 45 degrees. Examples of the pasting method include a method of performing lamination of rolls each other by using an adhesive film, and the like. Polarized light conversion to circularly polarized light can be carried out by mounting the circularly-polarizing plate on an emission light source while disposing the linearly-polarizing plate as a face closer to the light source and using the same.

<<Circularly Polarizing Reflection Plate>>

The circularly polarizing reflection plate includes (1) one having a cholesteric liquid crystalline structure, (2) one including a linearly polarizing reflection plate and a quarter wave plate, and the like.

—(1) One Having a Cholesteric Liquid Crystal Structure—

A cholesteric layer exhibiting circularly polarized light selective reflection requires to be adjusted so as to have a selective reflection central wavelength in accordance with the wavelength of an emission light source. Liquid crystalline phases exhibiting the circularly polarized light selective reflection include a cholesteric liquid crystalline phase having a helical structure and a chiral smectic liquid crystalline phase. A liquid crystalline substance exhibiting the cholesteric liquid crystalline phase or the chiral smectic liquid crystalline phase can be formed by mixing a non-chiral liquid crystalline compound and a chiral compound. Furthermore, as an alternative method, the substance can be obtained by copolymerizing these compounds to thereby form a polymer liquid crystal or a polymer film.

The central wavelength $\lambda$, of the selective reflection band depends on a pitch length P of the helical structure (=cycle of helix) in the cholesteric phase and chiral smectic phase, and follows the relationship between n being an average refractive index of the cholesteric layer and $\lambda = n \times P$. Therefore, by adjusting the pitch length of the helical structure, a wavelength exhibiting a selective reflection property can be controlled. The pitch length depends on the kind of a chiral compound in a liquid crystal composition or the addition concentration thereof and thus an intended pitch length can be obtained by adjusting these. Furthermore, as to the half-width of the selective reflection band, $\Delta\lambda$, $\Delta\lambda$ depends on the birefringence $\Delta n$ of a liquid crystal compound and the pitch length P, and follows the relationship of $\Delta\lambda = \Delta n \times P$. Therefore, the control of the width of the selective reflection band can be carried out by adjusting $\Delta n$. The adjustment of $\Delta n$ can be carried out by adjusting the kind or mixing ratio of liquid crystals, or adjusting temperature at the time of alignment fixing. Moreover, as another method for expanding the width of the selective reflection band, a method of laminating two or more cholesteric liquid crystal layers having shifted pitch lengths P, or of changing the pitch in the thickness direction of the cholesteric layer can be used.

In the selective reflection by the cholesteric liquid crystal, when the twist direction of helix (sense) of the cholesteric liquid crystal is right-handed, right-circularly polarized light is reflected and left-circularly polarized light is allowed to pass through, and when the sense is left-handed, left-circularly polarized light is reflected and right-circularly polarized light is allowed to pass through. Therefore, in the case where the light having passed through the polarization-state control member (for example FIG. 1 or FIG. 2) is used, when the irradiation with left-circularly polarized light is to be performed for the growth control or the like of a plant and the irradiation with a right-circularly polarized light component is not to be performed, a cholesteric liquid crystal layer of right-twisted sense can be used as the polarization-state control member, and when the irradiation with right-circularly polarized light is to be performed and the irradiation with a left-circularly polarized light component is not to be performed, a cholesteric liquid crystal layer of left-twisted sense can be used as the polarization-state control member. In the case where the reflected light from the polarization-state control member is used, when the irradiation with left-circularly polarized light is to be performed and the irradiation with a right-circularly polarized light component is not to be performed, a cholesteric liquid crystal layer of left-twisted sense can be used as the polarization-state control member, and when the irradiation with right-circularly polarized light is to be performed and the irradiation with a left-circularly polarized light component is not to be performed, a cholesteric liquid crystal layer of right-twisted sense can be used as the polarization-state control member.

Furthermore, the circularly polarizing reflection plate may have two or more polarized light control wavelength bands. The case is preferable in that two or more kinds of growth control functions can be obtained at the same time, when, for example, using the system of the present invention for the growth of a plant.

Hereinafter, materials constituting the cholesteric layer and a method for forming the cholesteric layer will be explained.

The cholesteric layer can be obtained by fixing a cholesteric liquid crystalline composition containing a liquid crystalline compound and a chiral compound, and containing an air interface alignment control agent, another compounding agent that is added as necessary (such as a polymerization initiator, a cross-linking agent, a surfactant) and other arbitrary component.

As the liquid crystalline compound, a low-molecular-weight liquid crystalline compound and a high-molecular-weight liquid crystalline compound are preferable, and the low-molecular-weight liquid crystal compound is more preferable because of short alignment time and high alignment evenness.

The liquid crystalline compound preferably has a polymerizable group, and more preferably exhibits a nematic phase or a chiral smectic phase. Furthermore, the molecular shape is preferably discotic or rod-like, is more preferably rod-like from the viewpoint of productivity, and is more preferably discotic when the reduction of angle dependency of the width of selective reflection is important. Rod-like nematic liquid crystalline compounds without a polymerizable group are described in various literatures (for example, Y. Goto et al., Mol. Cryst. Liq. Cryst. 1995, Vol. 260, pp. 23-28).

The polymerizable group can be introduced into a nematic liquid crystalline compound by a known method, without particular limitation. The polymerizable group is not particularly limited and can be appropriately selected in accordance with the purpose, and examples thereof include an epoxy group, a thioepoxy group, an oxetane group, a thiethanyl group, an aziridinyl group, a pyrrole group, a fumarate group, a cinnamoyl group, an isocyanate group, an isothiocyanate group, an amino group, a hydroxyl group, a carboxyl group, an alkoxysilyl group, a mercapto group, a vinyl group, an allyl group, a methacrylic group, an acrylic group, and the like. These may be used alone or in combination of two or more kinds thereof.

As a discotic compounds having a polymerizable group, compounds described in Japanese Patent Application Laid-Open No. 08-27284, 2001-100028 or 2006-76992 can be suitably used. The simultaneous use of two or more kinds of polymerizable nematic liquid crystalline compounds makes it possible to suppress the deposition of a crystal at the time of application and alignment, or to lower alignment temperature.

For example, a cholesteric liquid crystalline composition is obtained by mixing a polymerizable nematic liquid crystalline compound and a chiral compound (optically active compound).

The chiral compound is not particularly limited, and a known compound (for example, those described in Liquid Crystal Device Handbook, Chap. 3, Section 4-3, Chiral agent for TN, STN, p 199, edited by Japan Society for the Promotion of Science, No. 142 Committee, 1989), isosorbide or an isomannide derivative can be used.

The chiral compound (optically active compound) generally contains an asymmetric carbon atom, but an axially asymmetric compound or a planarly asymmetric compound which does not contain an asymmetric carbon atom can also be used as the chiral compound.

Examples of the axially asymmetric compound or planarly asymmetric compound include binaphthyl, helicene, paracyclophane, derivatives thereof and the like.

A chiral compound that induces a helical structure to a cholesteric liquid crystal has different sense of helix or pitch of helix to be induced depending on compounds, and thus the selection of a compound in accordance with the purpose is preferable. As a method for measuring sense or pitch of helix, a method described in "Easy Steps in Liquid Crystal Chemistry Experiment" p 46, edited by The Japanese Liquid Crystal Society, Sigma Publishing, published in 2007, and "Liquid Crystal Handbook" p 196, Editorial Committee of Liquid Crystal Handbook, Maruzen can be used.

The chiral compound may have a polymerizable group. When the chiral compound has a polymerizable group, a polymer having a nematic crystalline repeating unit and an optically active structure can be formed by a polymerization reaction of a polymerizable nematic liquid crystalline compound. The polymerizable group of the optically active compound is preferably the same group as the polymerizable group of the polymerizable nematic liquid crystalline compound. Accordingly, the polymerizable group of the optically active compound is also preferably an unsaturated polymerizable group, an epoxy group, an aziridinyl group, or the like, more preferably an unsaturated polymerizable group, further more preferably an ethylenically unsaturated polymerizable group.

When the chiral agent has a photoisomerization group, a pattern of an intended reflection wavelength corresponding to an emission wavelength can be formed by application and alignment, followed by photomask irradiation with an active ray or the like, which is preferable. As the photoisomerization group, an isomerization site of a compound exhibiting a photochromic property, an azo group, an azoxy group, and a cinnamoyl group are preferable. As a specific compound, a compound described in Japanese Patent Application Laid-Open No. 2002-80478, 2002-80851, 2002-179668, 2002-179669, 2002-179670, 2002-179681, 2002-179682, 2002-338575, 2002-338668, 2003-313189 or 2003-313292 can be used.

The content of the optically active compound is preferably 0.01% by mole to 200% by mole of the quantity of the polymerizable nematic liquid crystalline compound, more preferably 1% by mole to 30% by mole.

A polymerization initiator for a polymerization reaction is preferably added to the cholesteric liquid crystalline composition. The polymerization reaction includes a thermal polymerization reaction that uses a thermal polymerization initiator and a photo polymerization reaction that uses a photo polymerization initiator. Among these, the photo polymerization reaction that uses a photo polymerization initiator is particularly preferable.

The photo polymerization initiator is not particularly limited and can be appropriately selected in accordance with the purpose, and examples thereof include an α-carbonyl compound, acyloin ether, an α-hydrocarbon-substituted aromatic acyloin compound, a polynuclear quinone compound, a combination of triarylimidazol dimer and p-aminophenyl ketone, an oxadiazole compound, a halomethylated triazine derivative, a halomethylated oxadiazole derivative, an imidazole derivative, an anthraquinone derivative, a benzanthrone derivative, a benzophenone derivative, a thioxanthone derivative, an acridine derivative, a phenazine derivative, an oxime derivative, and the like.

The content of the photo polymerization initiator is preferably 0.01% by mass to 20% by mass of the solid content in the cholesteric liquid crystalline composition, more preferably 0.5% by mass to 5% by mass.

In the polymerization, a cross-linking agent can ben arbitrarily incorporated for improving film strength and improving durability after curing. As the cross-linking agent, those that are curable by ultraviolet rays, heat, moisture or the like can be suitably used.

The cross-linking agent is not particularly limited, and can be appropriately selected in accordance with the purpose. Examples thereof include polyfunctional acrylate compounds such as trimethylolpropane tri(meth)acrylate and pentaerythritol tri(meth)acrylate; epoxy compounds such as glycidyl(meth)acrylate and ethylene glycol diglycidyl ether; aziridine compounds such as 2,2-bis(hydroxymethyl)butanol-tris[3-(1-aziridinyl)propionate] and 4,4-bis(ethyleneiminocarbonylamino) diphenylmethane; isocyanate compounds such as hexamethylene diisocyanate and biuret type isocyanate; polyoxazoline compounds having an oxazoline group on a side chain; alkoxysilane compounds such as vinyltrimethoxysilane and N-(2-aminoethyl) 3-aminopropyltrimethoxysilane; and the like. Furthermore, in accordance with the reactivity of the cross-linking agent, a known catalyst can be used, productivity can be improved in addition to the improvement of film strength and durability. These may be used alone or in combination of two or more kinds thereof.

The content of the cross-linking agent is preferably 3% by mass to 20% by mass, more preferably 5% by mass to 15% by mass. When the content of the cross-linking agent is less than 3% by mass, the effect of improving cross-link density may not be obtained, and when the content exceeds 20% by mass, the stability of the cholesteric layer may be deteriorated.

—Air Interface Alignment Control Agent—

An alignment control agent that contributes to stably or rapidly serving as a cholesteric liquid crystal layer of a planar alignment may be added to the liquid crystal composition. Examples of the alignment control agent include fluorine-containing (meth)acrylate-based polymers, and compounds represented by a general formula (1) below. Two or more kinds selected from these may be contained. These compounds can reduce the tilt angle of a molecule of the liquid crystal compound or can make the molecule be horizontally aligned substantially at the air interface of the layer. Meanwhile, "horizontally aligned" in the description of the present application means that the major axis of a liquid crystal molecule and the film face are parallel to each other, but it does not require strict parallelism. In the description of the present application, it means such alignment that a tilt angle formed relative to the horizontal plane is less than 20 degrees. When a liquid crystal compound is aligned horizontally near the air interface, alignment defect is hardly generated. Therefore, transparency relative to light in non-polarized light conversion wavelength region becomes higher, and the degree of polarization relative to light in a polarized light conversion wavelength region can be enhanced. On the other hand, when a molecule in the liquid crystal compound is aligned with a large tilt angle, the helical axis of the cholesteric liquid crystalline phase shifts from the normal line of the film face and thus a reflectance is lowered or a finger print pattern is generated, and the degree of polarization is lowered due to the increase in haze or a diffraction property, which is not preferable.

Fluorine-containing (meth)acrylate-based polymers utilizable as the air interface alignment control agent are described, for example, in Japanese Patent Application Laid-Open No. 2007-272185, paragraphs [0018]-[0043], and the like.

Hereinafter, compounds that are represented by a general formula (1) below and are utilizable as the air interface alignment control agent will be explained.

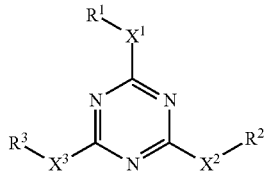

general formula (1)

In the general formula (1), $R^1$, $R^2$ and $R^3$ each independently represents hydrogen atom or a substituent, and $X^1$, $X^2$ and $X^3$ represent a single bond or a divalent linking group. Each of substituents represented by $R^1$ to $R^3$ is, preferably a substituted or unsubstituted, alkyl group (among these, an unsubstituted alkyl group or a fluorine-substituted alkyl group is more preferable), aryl group (among these, an aryl group having a fluorine-substituted alkyl group is preferable), a substituted or unsubstituted amino group, an alkoxy group and an alkylthio group, and a halogen atom. As each of divalent linking groups represented by $X^1$, $X^2$ and $X^3$, a divalent linking group selected from the group consisting of an alkylene group, an alkenylene group, a divalent aromatic group, a divalent hetero ring residue, —CO—, —NRa— (Ra is an alkyl group having 1-5 carbon atoms or hydrogen atom), —O—, —S—, —SO—, —SO$_2$— and combinations thereof is preferable. The divalent linking group is more preferably a divalent linking group selected from the group consisting of an alkylene group, a phenylene group, —CO—, —NRa—, —O—, —S— and —SO$_2$—, or a divalent linking group obtained by combining at least two groups selected from the group. The number of carbon atoms in the alkylene group is preferably 1 to 12. The number of carbon atoms in the alkenylene group is preferably 2 to 12. The number of carbon atoms in the divalent aryl group is preferably 6 to 10.

Examples of the compound that can be used as the air interface alignment control agent and that is represented by the general formula (1) include compounds described in, for example, Japanese Patent Application Laid-Open No. 2005-99248. As the air interface alignment control agent, compounds represented by the general formula (1) may be used alone or in combination of two or more kinds thereof.

The amount of the compound represented by the general formula (1) that is added to the cholesteric liquid crystalline composition is preferably 0.01% by mass to 10% by mass, more preferably 0.01% by mass to 5% by mass, particularly preferably 0.02% by mass to 1% by mass relative to the total mass of the cholesteric liquid crystal compound.

A surfactant can be used in order to adjust the surface tension of a coated film obtained by applying a cholesteric liquid crystalline composition containing a polymerization initiator and a liquid crystal compound onto a base material film and to thereby make the thickness uniform.

As the surfactant, one that does not disturb the alignment can be appropriately selected and used.

As the surfactant, for example, a nonion-based surfactant containing siloxane, a fluorinated alkyl group in a hydrophobic group portion can be suitably used, and an oligomer having two or more hydrophobic group portions in one molecule is particularly suitable.

As the surfactant, commercially available products can be used. As the commercially available product, for example, PF-151N, PF-636, PF-6320, PF-656, PF-6520, PF-3320, PF-651 or PF-652 of PolyFox manufactured by OMNOVA Solutions Inc., FTX-209F, FTX-208G or FTX-204D of FUTARGENT manufactured by Neos Co., Ltd., KH-40 of SurfIon manufactured by AGC SEIMI CHEMICAL CO., LTD., or the like can be used. Furthermore, fluorinated compounds described in paragraph [0087] of Japanese Patent Application Laid-Open No. 2002-341126, and fluorinated compounds described in paragraphs [0064]-[0080] and paragraphs [0092]-[0096] of Japanese Patent Application Laid-Open No. 2005-99248, can be suitably used.

The content of the surfactant is preferably 0.01% by mass to 1% by mass in the cholesteric layer. When the content of the surfactant is less than 0.01% by mass, the surface tension at the air interface is not sufficiently reduced and thus an alignment defect may be generated, and when the content exceeds 1% by mass, an excessive surfactant forms an uneven structure on the air interface side and thus alignment evenness may be lowered.

As a method of manufacturing the cholesteric layer, the cholesteric layer in which cholesteric regularity is fixed can be formed by applying, on a horizontally aligned film on a base material, a cholesteric liquid crystalline composition obtained by dissolving, in a solvent, the polymerizable liquid crystal compound and the polymerization initiator, and the chiral agent, the surfactant and the like which are furthermore added as necessary; drying the same to thereby obtain a coated film; and irradiating the coated film with active light to thereby polymerize the cholesteric liquid crystalline composition. When forming a laminated film including a plurality of cholesteric layers, the laminated film can be obtained by repeating the manufacturing process of the cholesteric layer.

The solvent used for preparing the cholesteric liquid crystalline composition is not particularly limited and can be appropriately selected in accordance with the purpose, and an organic solvent is preferably used.

The organic solvent is not particularly limited and can be appropriately selected in accordance with the purpose. Examples thereof include ketones, alkyl halides, amides, sulfoxides, hetero ring compounds, hydrocarbons, esters, ethers, and the like. These may be used alone or in combination of two or more kinds there'd. Among these, ketones are particularly preferable in consideration of effect on the environment.

The horizontally aligned film can be provided by a technique such as a rubbing treatment of an organic compound or a polymer (resins such as polyimide, polyvinyl alcohol, polyester, polyarylate, polyamide-imide, polyetherimide, polyamide and modified polyamide), oblique deposition of an inorganic compound, formation of a layer having a microgroove, or accumulation of an organic compound (such as co-tricosanoic acid, dioctadecylmethylammonium chloride, methyl stearylate) by a Langmuir-Blodgett process (LB film). Furthermore, an alignment film that generates alignment function by application of an electric field, application of a magnetic field or light irradiation is also known. Among these, an alignment film to be formed by a rubbing treatment of a polymer is particularly preferable. The rubbing treatment can be carried out by unidirectionally rubbing several times the surface of a polymer layer with paper or cloth.

The application of the cholesteric liquid crystalline composition onto the alignment film is not particularly limited and can be appropriately selected, and examples thereof include a curtain coating method, an extrusion coating method, a direct gravure coating method, a die coating method, a spin coating method, a dip coating method, a spray coating method, a slide coating method and the like. Furthermore, the application can also be carried out by transferring the cholesteric liquid crystalline composition coated separately on a substrate, onto the alignment film. By heating the applied cholesteric liquid crystalline composition, the liquid crystalline composition is aligned. The heating temperature is preferably 200° C. or lower, more preferably 130° C. or lower. By the alignment treatment, an thin optical film, in which a polymerizable rod-like nematic liquid crystalline compound is in a twisted-alignment state so as to have a helical axis in a direction substantially perpendicular to the surface of the thin optical film, can be obtained.

The aligned polymerizable rod-like nematic liquid crystalline compound is further polymerized. As to the polymerization, photo polymerization by light irradiation is preferred rather than thermal polymerization. In the light irradiation, the use of ultraviolet rays is preferable. The irradiation energy is preferably 20 mJ/cm$^2$ to 50 J/cm$^2$, more preferably 100 mJ/cm$^2$ to 1,500 mJ/cm$^2$. In order to accelerate the photo polymerization reaction, the light irradiation may be carried out under a heated condition or a nitrogen atmosphere. The wavelength of irradiation ultraviolet rays is preferably 350 nm to 430 nm. As to a polymerization reaction ratio, a higher one is preferable, 70% or more is preferable, and 80% or more is more preferable, from the viewpoint of stability.

The polymerization reaction ratio can be determined by measuring a consumption ratio of a polymerizable functional group by using an IR absorption spectrum.

The thickness of the cholesteric layer is preferably 0.1 μm to 50 μm, more preferably 0.5 μm to 10 μm, further more preferably 1.5 μm to 7 μm.

Meanwhile, a blue phase that appears between the cholesteric phase having a relatively short helical pitch and an isotropic phase also exhibits the Bragg reflection in an ultraviolet/visible zone and the light reflected therefrom is circularly polarized light in the same way as the cholesteric liquid crystal, and thus it can also be utilized. As to the blue phase, following literatures can be referred to.

H. S. Kitzerow, H. Schmid, A. Ranft, G. Heppke, R. A. M. Hikmet, J. Lub, Liq. Cryst., 14, 911-916 (1993).

H. Kikuchi, M. Yokota, Y. Hisakado, H. Yang and T. Kajiyama, Nature Materials. 1, 64 (2002).

—(2) One Including a Linearly Polarizing Reflection Plate and a Quarter Wave Plate—

Examples of the linearly polarizing reflection plate include (i) a linearly polarizing reflection plate of a multilayer structure, (ii) a polarizer in which thin films having different birefringent properties are laminated, (iii) a wire grid-type polarizer, (iv) a polarization prism, (v) an anisotropic scattering type polarizing plate, and the like.

As the quarter wave plate, one similar to those described above can be used.

(i) As the linearly polarizing reflection plate of a multilayer structure, one constituted by laminating dielectric thin films having different refractive indices from each other in plural layers is included. In order to make a wavelength selective reflection film, alternate lamination of a dielectric thin film of a high refractive index and a dielectric thin film of a low refractive index in plural layers is preferable. The kind of the layer is not limited to two kinds, but may be more kinds.

The number of layers to be laminated is preferably 2-20, more preferably 2-12, further more preferably 4-10, and particularly preferably 6-8. When the lamination number exceeds 20, multilayer deposition lowers production efficiency and the purpose and effect of the present invention may not be achieved.

The lamination order of dielectric thin films is not particularly limited and can be appropriately selected in accordance with the purpose, and for example, when an adjacent film has a high refractive index, a film having a lower refractive index than the adjacent film is laminated first. In an opposite manner, when an adjacent layer has a low refractive index, a film having a higher refractive index than the layer is laminated first. A boundary line whether the refractive index is high or low is 1.8. Whether a refractive index is high or low is not an absolute matter, but even among materials of high refractive indices, materials having a relatively large refractive index and a relatively small one may exist and these may be used alternately.

Examples of the material of a dielectric thin film having a high refractive index include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$, $ZrO_2$, and the like. Among these, $Bi_2O_3$, $CeO_2$, $CeF_3$, $HfO_2$, $SiO$, $Ta_2O_5$, $TiO_2$, $Y_2O_3$, $ZnSe$, $ZnS$ and $ZrO_2$ are preferable, and $SiO$, $Ta_2O_5$, $TiO_2$, $Y_2O_3$, $ZnSe$, $ZnS$ and $ZrO_2$ are particularly preferable.

Examples of the material of a dielectric thin film having a low refractive index include $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$, $ThF_4$, and the like. Among these, $Al_2O_3$, $BiF_3$, $CaF_2$, $MgF_2$, $MgO$, $SiO_2$ and $Si_2O_3$ are preferable, and $Al_2O_3$, $CaF_2$, $MgF_2$, $MgO$, $SiO_2$ and $Si_2O_3$ are particularly preferable.

In the material of a dielectric thin film, a molecular ratio is also not particularly limited, and can be appropriately selected in accordance with the purpose. The atomic ratio can be adjusted by changing the concentration of an atmospheric gas at the time of film formation.

A method for forming a dielectric thin film is not particularly limited but can be appropriately selected in accordance with the purpose, and examples thereof include vacuum evaporation methods such as an ion plating method and an ion beam method, physical vapor deposition methods (PVD method) such as sputtering, chemical vapor deposition methods (CVD method), and the like. Among these, the vacuum evaporation method and the sputtering method are preferable, and the sputtering method is particularly preferable.

As the sputtering method, a DC sputtering method with a high deposition rate is preferable. In the DC sputtering method, the use of a material of high conductivity is preferable.

Furthermore, as a method for performing multilayer deposition by the sputtering method, there are, for example, (1) a one chamber method that performs deposition alternately or in order from a plurality of targets in one chamber, and (2) a multi chamber method that performs deposition continuously in a plurality of cambers. Among these, from the viewpoint of productivity and prevention of material contamination, the multi-chamber method is particularly preferable.

The thickness of the dielectric thin film is, in an optical wavelength order, preferably $\lambda/16$ to $\lambda$, more preferably $\lambda/8$ to $3\lambda/4$, further more preferably $\lambda/6$ to $3\lambda/8$.

In an evaporated layer of a dielectric substance, a part of light transmitting in the evaporated layer of a dielectric substance is multiply reflected for every dielectric thin film and these reflected rays of light interfere with one another, and only light having a wavelength determined by the product of the thickness of the dielectric thin film and the refractive index of the film for the light is transmitted selectively. Furthermore, the central transmission wavelength of the evaporated layer of a dielectric substance has an angle dependency relative to incident light, and the transmission wavelength can be changed by changing incident light.

(ii) As a polarizer in which thin films having different birefringent properties are laminated, those described in Japanese Unexamined Patent Application Publication (Tanslation of PCT application) No. 09-506837 or the like can be used.

Specifically, by performing processing under conditions selected for obtaining the relationship of refractive indices, a polarizer can be formed by widely using various materials. Generally, one of first materials is required to have a refractive index different from that of a second material in a selected direction. The difference in refractive indices can be achieved by various methods including stretching during film formation or after film formation, extrusion molding and coating. Furthermore, two materials preferably have similar rheologic properties (for example, molten viscosity) so that they can be coextruded.

As a polarizer obtained by laminating thin films having different birefringent properties, a commercially available product can be used. Examples thereof include a trade name DBEF manufactured by 3M Ltd.

(iii) The wire grid-type polarizer is a polarizer that lets one polarized light component be transmitted and the other component be reflected, by birefringence of thin metal wires.

The wire grid polarizer is a polarizer obtained by arranging periodically metal wires, and is used mainly as a polarizer in a terahertz wave band. In order for a wire grid to function as a polarizer, it becomes necessary that the interval between wires is sufficiently smaller than the wavelength of incident electromagnetic wave.

In the wire grid polarizer, metal wires are disposed at regular intervals. A polarized light component in a polarization direction that is parallel to the longitudinal direction of the metal wire is reflected by the wire grid polarizer, and a polarized light component in the perpendicular polarization direction passes through the wire grid polarizer.

As the wire grid-type polarizer, a commercially available product can be used. Examples of the commercially available product include a wire grid polarizing filter 50×50, NT46-636 manufactured by Edmund Optics Inc., and the like.

—Diffusing Plate or Retardation Plate—

Inclusion of either a diffusing plate or a retardation plate between the emission light source and the circularly polarizing reflection plate is preferable from the viewpoint of depolarization in recycling reflected light, to thereby improve the recycling efficiency of light.

Phase difference in in-plane direction (in-plane retardation Re) of the retardation plate is preferably 300 nm or more at a wavelength of 550 nm, more preferably 1,000 nm or more. When the phase difference in in-plane direction is less than 300 nm at a wavelength of 550 nm, the depolarization may become insufficient, thereby resulting in a low recycling efficiency.

The diffusing plate or retardation plate may also serve as a base material.

The diffusing plate or retardation plate may contain an UV absorbing agent.

<Circularly Polarized Light-Reflecting Member>

The circularly polarized light-reflecting member may be a member that can selectively reflect circularly polarized light having the same sense as the incident circularly polarized light, and is not particularly limited.

For example, a) a member having a cholesteric liquid crystal structure, and b) a member constituted of a linearly polarizing reflection plate or a reflection plate, and a quarter wave plate can be used, as is the case for the circularly polarizing reflection plate used as the above-described polarization-state control member.

The circularly polarized light-reflecting member may also function as the polarization-state control member, and the circularly polarized light-reflecting member may be a member that is the same as the polarization-state control member.

a) Design of a Circularly Polarized Light-Reflecting Member Having a Cholesteric Liquid Crystal Structure As a member having the cholesteric liquid crystal structure, the above-described member can be used. The member preferably reflects circularly polarized light having the circularly polarized light sense that is the same as that of the incident light in a wavelength region in a circularly polarization state among the incident light rays, and thus, the circularly polarized light reflection wavelength and sense of the member is adjusted in accordance with the wavelength dependency of a circularly polarization state of a lighting device to be used, or the wavelength dependency of a circularly polarization state that is expected to be used as reflected light. The adjustment can be performed by a technique that is same as that for the polarization-state control member. However, in a usage state where an incident angle of light into the member becomes large, the central wavelength λ of reflected light shifts to a shorter wavelength side, and thus adjustment of the pitch length to a longer side is preferable depending on circumstances. The central wavelength λ of the reflected light has a relationship represented by a formula below with an angle α formed between a lighting device and the normal line of the surface of a reflection member. Therefore, for example, by making the pitch length longer by about 10% when a is 40 degrees, or by around 20% when it is 60 degrees, the reflectance of reflected circularly polarized light can be kept high.

$$\lambda = n \times p \times \cos(\sin-1(\sin(\alpha)/n))$$

In the formula, n is an average refractive index of a cholesteric liquid crystal, and p is a helical pitch length of the cholesteric liquid crystal.

When light (natural light and the like) other than specific circularly polarized light emitted from the lighting device may enter the circularly polarized light-reflecting member, the use of a member having a general cholesteric liquid crystal structure that reflects the specific circularly polarized light irrespective of incident light is preferable.

Furthermore, in the case where light (natural light and the like) other than the specific circularly polarized light emitted from the lighting device is hard to enter the circularly polarized light-reflecting member in such a case as being used integrally with a lighting device that gives circularly polarized light, a member, in which a cholesteric liquid crystal structure of right helix and a cholesteric liquid crystal structure of left helix are laminated and which is formed so as to reflect light continuously over the emission wavelength region of the lighting device, can also be used as a circularly polarized light-reflecting member of the present invention. In this case, there is a feature of being able to selectively reflect circularly polarized light having the sense same as that of the incident circularly polarized light in accordance with properties of circularly polarized light wavelength dependency of the lighting device.

As to the disposition of the member, for the purpose of keeping the circular polarization degree of reflected light high, the cholesteric liquid crystal structure face is disposed on a target object to be irradiated with the reflected light, and a birefringent transparent medium such as a base material is disposed so as to be placed on the back face side thereof. Moreover, when forming a hard coat layer, an antifouling layer, or a polymer layer on the object side of the cholesteric liquid crystal structure face for antifouling properties and abrasion-resistant properties, the circular polarization degree can be kept high by using a substance having a small birefringence.

For the purpose of alleviating the unevenness of reflected light amount of the reflected light for a target object, the reflection member can also be provided with a scattering property in such a range that does not lower the polarized light reflection property. The scattering property can be given to the cholesteric liquid crystal structure itself, by tilting the helical axis of the cholesteric liquid crystal in random directions from the normal line of a liquid crystal face by using an alignment film not having been subjected to a rubbing treatment in the process of forming the cholesteric liquid crystal structure. Furthermore, the scattering property can be obtained by mounting or applying a scattering film or an antiglare layer having a small depolarization property that are used for a reflection type liquid crystal display on an irradiation substance side of the cholesteric liquid crystal structure.

b) Design of a Circularly Polarized Light-Reflecting Member Including a Laminate of a Linearly Polarizing Reflection Plate or Reflection Plate, and a Quarter Wave Plate.

As the linearly polarizing reflection plate and the quarter wave plate, above-described plates can be used.

As the reflection plate, in addition to an ordinary mirror, one that does not exhibit a polarization property in the reflected light in itself but is hard to depolarize polarized light can be suitably used, including films with an evaporated metal such as aluminum or silver, an inorganic multilayered film such as a dielectric mirror and Reftel, a polymer multilayered thin film manufactured by Teijin Limited, etc.

Since the laminate of the linearly polarizing reflection plate and the quarter wave plate reflects only right- or left-circularly polarized light over all the wavelengths, the use thereof in combination with a lighting device that emits either right- or left-circularly polarized sense alone irrespective of the wavelength of the light emitted from the light source is preferable. Furthermore, when light (natural light etc.) other than specific circularly polarized light emitted from the lighting device may enter the circularly polarized light-reflecting member, the use of the laminate of the linearly polarizing reflection plate and the quarter wave plate is preferable.

When light (natural light etc.) other than specific circularly polarized light emitted from the lighting device is hard to enter the circularly polarized light-reflecting member, and when such a lighting device that right and left of the sense of circularly polarized light coexist depending on the wavelength of light emitted from a light source is used in particular, the laminate of the reflection plate and the quarter wave plate, which reflects circularly polarized light of the sense same as that of the incident circularly polarized light whether it may be right-circularly polarized light or left-circularly polarized light, is suitable.

As to the disposition of these members, the quarter wave plate is disposed on a target object side. When a linearly polarizing reflection plate is to be used, the slow axis of the quarter wave plate and the polarized light reflection axis of the linearly polarizing reflection plate are intersected so as to give 45 degrees. On the other hand, in the case of the reflection plate, it may intersect with the slow axis of the quarter wave plate at an arbitrary angle. The linearly polarizing reflection plate or the reflection plate and the quarter wave plate can be set so as not to shift from each other with a holding jig such as an adhesive tape or clip, or, in addition, can also be pasted while placing an agglutinant or an adhesive that is transparent with no birefringence between the quarter wave plate and the reflection plate. Furthermore, when forming a hard coat layer, an antifouling layer, or a polymer layer on the object side of the quarter wave plate for antifouling properties and abrasion-resistant properties, the circular polarization degree can be kept high by using a substance having a small birefringence.

For the purpose of alleviating the unevenness of reflected light amount for a target object, the reflection member may also be provided with a scattering property in such a range that does not lower the polarized light reflection property. The scattering property can be given by providing fine irregularities for the linearly polarizing reflection plate or the surface of the reflection plate by embossing or the like. Moreover, the scattering property can also be given by mounting or applying a scattering film or an antiglare layer having a small depolarization property that are used for a reflection-type liquid crystal display, between the quarter wave plate and the reflection plate or on an irradiation substance side of the quarter wave plate.

Both of the above-mentioned a) and b) can be suitably used as the circularly polarized light-reflecting member of the present invention.

Furthermore, since the reflection angle of reflected light can be arbitrarily controlled by setting the cross-sectional shape of the polarized light reflection member to be a serrated shape or a curved face shape, specific circularly polarized light can be irradiated effectively to the side face or back side of a leaf of a target plant. These reflection members can also be applied to a growth apparatus in which a transparent base material such as glass or acrylic resin is used for a wall face and/or a floor face, such as a restaurant or a kitchen garden system or the like characterized by exhibiting the growth of lettuce and the like. In this case, the polarized light reflection member of a cholesteric liquid crystal structure and a laminate of the linearly polarizing reflection plate and the quarter wave plate have a feature of not damaging a see-through property when mounted, and, furthermore, in the case of a polarized light reflection member of a cholesteric liquid crystal structure capable of adjusting reflection wavelength, it is also possible to give see-through property of hue that do not provide a feeling of unnaturalness to somebody by adjusting the balance of transmitted light.

As already described, when the circularly polarized light-reflecting member is provided on a part of the inside surface of a structure, the inside surface of the structure other than the portion where the circularly polarized light-reflecting member is provided is preferably painted in black or covered with a member of low reflection. In particular, in the case where light (natural light and the like) other than the specific circularly polarized light emitted from the lighting device can enter the system of the present invention, the inside surface of the structure other than the portion in which the circularly polarized light-reflecting member is provided is preferably painted in black or covered with a member of low reflection.

Furthermore, the back face of the face on which the circularly polarized light-reflecting member is provided (a wall face, floor face etc. of a structure) is preferably painted in black or covered with a member of low reflection. In particular, when light (natural light and the like) other than the specific circularly polarized light can enter the system of the present invention, the back face of the face for which the circularly polarized light-reflecting member is provided (a wall face, floor face etc. of a structure) is preferably painted in black or covered with a member of low reflection. In the case where light (natural light and the like) other than the specific circularly polarized light cannot enter the system of the present invention, even when the back face of the face on which the circularly polarized light-reflecting member is provided is white or in other color, the circular polarization degree of reflected light can be kept high.

<Use Applications>

As described below, the system of the present invention can be widely used in various fields such as plant factories, fresh item management, chemical synthesis, fisheries, health and medical care, and among these, the system is suitably used as a method for controlling the growth of a plant to be described later.

The mechanism that circularly polarized light takes part in growth of a plant is assumed as follows.

Phytochromobin and Flavin that are chromophores contained in chlorophyll being a central dye of photosynthesis by a plant and the light receptor such as phytochrome, Cryptochrome, phototropin and ZTL which take part in acceleration or suppression of flower bud formation, growth control and the like of a plant are optically active compounds, and thus, have absorption dichroism for circularly polarized light in the vicinity of a light absorption wavelength region. Namely, the light to be absorbed by the light receptor is either right- or left-circularly polarized light, and the circularly polarized light of the other sense is hardly absorbed as compared with that, and thus it is difficult to induce the function of the light receptor even by the irradiation of the latter. Consequently, it is assumed that, when irradiation with either right- or left-circularly polarized light alone is performed, a phenomenon of different growth is generated.

In the case of phytochrome that takes part in photoperiodism of a plant, there are a red light-absorbing type having an absorption maximum in the vicinity of 650 nm and a far-red light-absorbing type having an absorption maximum in the vicinity of 750 nm, and the light irradiation in the vicinity of 650 nm converts the red light-absorbing type to the far-red light-absorbing type. On the other hand, the light irradiation in the vicinity of 750 nm converts the far-red light-absorbing type to the red light-absorbing type. Furthermore, the conversion of the far-red light-absorbing type to the red light-absorbing type also progresses due to lapse of time in a dark state. The amount of the far-red light-absorbing type generated by these reactions controls flowering time of a plant. By controlling artificially the reaction, the control of the flowering time by, for example, the nighttime illumination as is done in the cultivation of chrysanthemum is possible. By using the system of the present invention, it is possible to select a light source, a polarization-state control member and a circularly polarized light-reflecting member so that irradiation with right-circularly polarized light to be absorbed by phytochrome only in the absorption wavelength region of phytochrome is performed, to thereby give the effect of lighting effectively.

—Nocturnal-Type Harmful Insects—

For the purpose of controlling armyworms of a nocturnal-type harmful insect that is a typical harmful insect for cabbage, spinach, and the like, a method for illuminating the vicinity of the crops at night have been adopted, but a problem has arisen in that flower buds are formed by phytochrome in response to the illumination light to thereby deteriorate remarkably the commercial value. As the countermeasure for this, illumination from which red light component has been removed is sometimes used, but since the hue is unnatural, a strange atmosphere is given to a production area.

In the system of the present invention, by irradiation with left-circularly polarized light that is not absorbed by phytochrome only in the absorption wavelength region of phytochrome, it becomes possible to satisfy both control of harmful insects and suppression of flower stalk formation, even with illumination light of white light that gives, in appearance, no feeling of unnaturalness to ordinary persons.

Through the use of the system of the present invention, when giving, for example, strong irradiation with polarized light at a specific wavelength, or, in an opposite manner, irradiation with polarized light that is not absorbed, certain kind of stress is given to a plant, and thus it may be possible to promote the production of the medicinal ingredients of herbs, or to control a component ratio of secondary metabolites such as umami, nutritional component, perfume component and antioxidant.

Furthermore, through the irradiation with circularly polarized light of sense that is effective in a method for controlling plant disease by enhancing resistance properties for disease through the irradiation with ultraviolet light, which gathers attention recently, it is possible to lower the total irradiation amount to thereby reduce damage due to ultraviolet rays, or, in an opposite manner, it may be possible to effectively activate, with low illuminance, a DNA light repair property and a bioswitch by blue light other than ultraviolet light.

Since there are various plants and many kinds of chromophores on the earth, the change of a circularly polarized light wavelength band and sense in accordance with a plant and purpose of control is important. Of course, there is also a case where simultaneous irradiation with circularly polarized lights of different senses is preferable as in the case of right-circularly polarized light in a certain wavelength and left-circularly polarized light in another wavelength band, and the system of the present invention can be used also for the purpose.

In the system of the present invention, it is possible to use different wavelength bands of polarized light conversion by changing a conversion member in accordance with the timing of a growth process of a plant such as dormancy, germination, grown seedling, cell elongation period and floral differentiation. Furthermore, timing of irradiation or light intensity, or polarization state can also be adjusted in accordance with the timing of circadian phases. Moreover, it is possible to use it in a different way such as the use of pulse-like emission, or carrying out irradiation in a different polarization state in accordance with the site of a plant to be irradiated. In a plant factory, light irradiation by the system of the present invention and the control of humidity, temperature or gas concentration may be combined.

(Method for Controlling Growth of a Plant)

The system of the present invention can be applied to a method for controlling growth of a plant.

The method of controlling growth of a plant includes growth acceleration of a plant and growth suppression of a plant.

The growth acceleration of a plant means the increase in the plant body by extension of plant height, stem length or between nodes, extension of the length of the side branch, and the like.

The growth acceleration action of a plant makes it possible to enlarge rapidly the weight or height of agricultural crops to thereby raise the productivity. Furthermore, large agricultural crops can be easily grown. Moreover, there is an advantage that the number of generation change can be made larger because of rapid full growth in breeding.

The suppression of plant growth means dwarfing of a plant body by suppression of the extension of plant height, stem length, between nodes etc. suppression of the length of the side branch, etc. The dwarfing means that the stem and branches of a plant become thick and strong and resistant to adverse conditions of nature such as wind or rain, and that the nutrient content such as chlorophyll or vitamins per unit area increases.

Low height of a plant by the suppression action of plant growth gives such an advantage as resistant to wind damage due to typhoons etc., and hard to fall down even grains increase. For example, in the case of rice, since the number of columns to plant seedlings can be increased, the planting seedlings density per unit area can be made larger. By applying the system to fruit trees which become several meters in height (banana, mango, etc.) or palm trees (date palm, coconut, etc.), harvesting of the fruit becomes easier. Further, the smaller than usual, the more advantages as increasing the commercial value in cut flowers, ornamental plants and bonsai plant, and attracting interest of consumers.

In the method for controlling growth of a plant using the system of the present invention, timing adjustment of the irradiation (circadian phase, growth process (such as dormancy, germination, grown seedling, cell elongation period)), pulsed illumination or the polarized light conversion wavelength band can be changed based on diurnal and the growth process. The timing adjustment of the irradiation, pulsed illumination or the polarized light conversion wavelength band can be changed in accordance with a plant and purpose. The light can be irradiated partially. Furthermore, it may be combined with the control of humidity, temperature, gas concentration, illuminance or irradiation time.

Specifically, also in a flower bud formation by day length, a regression reaction, chloroplast movement, gap open, flavonoid biosynthesis, plant disease control (method for increasing the resistance for disease by applying a UV), the UV damage can be reduced by the irradiation of one effective circularly polarized light.

Further, the control on light bending, on/off of gene transcription and gene expression, the control on secondary metabolites (nutritional ingredients, aroma components, flavor, antioxidants, medicinal properties), the control on giving stress, a DNA light repair property, a blue light bio switch etc. can be mentioned.

—Target Plants—

Target plants used in the method for controlling growth of a plant are not particularly limited and can be appropriately selected in accordance with the purpose, and examples thereof include vegetable families of Cucurbitaceae, Solanaceae, Leguminosae, Rosaceae, Cruciferae, Asteraceae, Umbelliferae, Chenopodiaceae, Gramineae, Malvaceae, Araliaceae, Labiatae, Zingiberaceae, Nymphaeaceae and Araceae; flowers and ornamental plants families of cut flowers or pot flowers of Asteraceae, Rosaceae, Araceae, Caryophyllaceae, Brassicaceae, Plumbaginaceae, Gentianaceae, Scrophulariaceae, Leguminosae, Paeoniaceae, Iridaceae, Solanaceae, Amaryllidaceae, Orchidaceae, Agavaceae, Cornaceae, Rubiaceae, Salicaceae, Ericaceae, Oleaceae, Magnoliaceae, Primulaceae, Begoniaceae, Labiatae, Geraniaceae, Crassulaceae, Ranunculaceae, Gesneriaceae, Cactaceae, fiddlehead fern, Araliaceae, Moraceae, Commelinaceae, Bromeliaceae, Marantaceae, Euphorbiaceae, Piperaceae, Euphorbia lasiocaula, Saxifragaceae, Onagraceae, Malvaceae, Myrtaceae, Theaceae and Nyctaginaceae; fruit tree families of Rosaceae, Vitaceae, Moraceae, Ebenaceae, Ericaceae, Lardizabalaceae, Actinidiaceae, Passifloraceae, Rutaceae, Anacardiaceae, Bromeliaceae and Myrtaceae; algae; and the like.

More detailed examples thereof include vegetables such as cucumber, melon, pumpkin, bitter gourd, zucchini, watermelon, crenshaw, wax gourd, loofah, Kinshiuri, tomato, green pepper, red pepper, eggplant, pepino, pepper, peas, kidney beans, black-eyed pea, green soybean, broad bean, winged bean, podded pea, green bean, hyacinth bean, strawberry, corn, okra, broccoli, radish sprouts, watercress, Chinese cabbage, Tsukena, lettuce, butterbur, garland chrysanthemum, edible chrysanthemum, celery, parsley, honewort, Japanese parsley, green onions, scallions, leeks, asparagus, spinach, Barilla, Udo, Japanese basil, ginger, radish, turnip, horseradish, radish, rutabaga, new stock, garlic, shallot, lotus root and aroid; flowers and ornamental plants such as aster, Rhodanthe, thistle, pink, stock, edible flowers, Statice, Turkey balloon flower, snapdragon, sweet pea, iris, chrysanthemum, liatris, gerbera, Margaret, *Gymnaster savatieri*, Shasta daisy, carnation, *Gypsophila paniculata*, gentian, peony, Japanese lantern, Heraklion, dahlia, color, gladiolus, iris, freesia, tulip, daffodil, amaryllis, cymbidium, dracaena, rose, flowering quince, cherry, peach, plum, reeves spirea, raspberry, rowan, dogwood, silkworm eggs, Ixora chinensis, Bulbapedia, willow, azalea, forsythia, magnolia, Cineraria, Dimorphotheca, primula, petunia, begonia, gentian, coleus, geranium, *Pelargonium, Rokeya, Anthurium*, clematis, lily of the valley, African violet, cyclamen, ranunculus, *Gloxinia, Dendrobium, Cattleya, Phalaenopsis, Vanda, Epidendrum*, oncidium, Christmas cactus, *Schlumbergera bridgesii*, peacock cactus, kalanchoee, Nephrolepis, Adiantum, *Asplenium antiquum* Makino, pothos, *Dieffenbachia, Spathiphyllum, Syngonium*, spider plant, *Schefflera, Hedera*, rubber tree, dracaena, *Cordyline*, bridal veil, Ananas group, *Calathea*, croton, Peperomia, poinsettia, hydrangea, fuchsia, hibiscus, gardenia, *Leptospermum scoparium*, camellia, *Bougainvillea* and *Paeonia*; fruit trees such as pear, peach, cherry, plum, apple, prune, nectarine, apricot, raspberry, Japanese plum, grape, fig, persimmon, blueberry, chocolate vine, kiwifruit, passion fruit, loquat, tangerine, Marrcollet, lemon, *Citrus junos, Citrus medica* var. *sarcodactylus, Citrus hassaku, Citrus maxima*, citron flowers, kumquat, Seminole, lyokan, navel orange, Encore, Nova, *Citrus tamurana*, lime, *Citrus sudachi, Citrus sphaerocarpa*, Banpeiyu, Tankan, mango, pineapple and guava; algae, or the like.

Among these, *Brassica rapa* var. *perviridis*, leafy vegetables, cruciferous Tsukena class, is particularly preferable.

According to the method for controlling growth of a plant using the system of the present invention, satisfaction of both of the protection from harmful insects and the suppression of bolting (a phenomenon in which a scape bolts after flower bud differentiation) can be achieved, and control of flowering time, improvement of efficiency of growth suppression and acceleration of plants (vegetables, fruits, and the like), and the light pollution prevention can be achieved.

In addition to these, the system of the present invention can be applied to phenomena in which a substance interacts with circularly polarized light. For example, it is known that an optically active substance has circularly polarized light absorption dichroism and the optical density can be raised by the irradiation with circularly polarized light of one sense to thereby photodecompose an optically active body having a larger absorption coefficient. The system can be suitably used also as a vessel for the reaction. The use of this makes it possible to increase the amount of irradiation of the substance with circularly polarized light and the reduction of an experimental time can be achieved.

In recent years, for the optical resolution, it has been found that D-amino acids and L-sugars, which are rare in the natural world, play an important role in the umami and richness of sake, coffee, fruits or the like, and thus there is also an use application of utilizing the system for controlling optical purity of substances such as amino acids in food by isomerizing L-amino acid to D-amino acid, or the like by irradiating these foods with circularly polarized light.

EXAMPLES

Hereinafter, the features of the present invention will be explained further specifically while describing Examples and Comparative Example. Materials, usage amount, percentage, treatment content, treatment procedure and the like can be appropriately changed without departing from the purport of the present invention. Accordingly, the scope of the present invention should not be construed as being more limited to specific examples shown below.

—Production of Polarization-State Control Members 1 to 3 Having a Cholesteric Liquid Crystal Structure and Circularly Polarized Light Reflection Films 1 to 3—

Respective application liquids (A), (B), (C), (D), (E), (F), (G) and (H) having compositions shown in a table below were prepared. Numerical values of the application liquid compositions in Table 1 are represented in part by mass. In addition, the central wavelength of a selective reflection peak and the sense of helix of a cholesteric liquid crystal after the alignment and the polymerization and fixing were also listed.

TABLE 1

| Compounding component | Name of cholesteric liquid crystal application liquid | | | | | | | |
|---|---|---|---|---|---|---|---|---|
| Component of application liquid | A | B | C | D | E | F | C | H |
| Polymerizable liquid crystal compound 1 | 50 | 50 | 50 | 50 | 50 | 50 | 50 | 50 |
| Polymerizable liquid crystal compound 2 | 50 | 50 | 50 | 50 | 50 | 50 | 50 | 50 |
| Paliocolor LC-756, by BASF | 7.6 | 6.4 | 5.3 | 4.7 | 0 | 0 | 0 | 0 |
| Compound 3 | 0 | 0 | 0 | 0 | 11 | 10.2 | 8.6 | 7.5 |
| Compound 4 | 0.04 | 0.04 | 0.04 | 0.04 | 0.04 | 0.04 | 0.04 | 0.04 |
| Irgacure-819, by Ciba Specialty Chemicals | 3 | 3 | 3 | 3 | 3 | 3 | 3 | 3 |
| CHCl3 | 300 | 300 | 300 | 300 | 300 | 300 | 300 | 300 |
| Sense of cholesteric helix | Right | Right | Right | Right | Left | Left | Left | Left |
| Wavelength center/nm | 430 | 510 | 610 | 700 | 440 | 520 | 620 | 720 |

Polymerizable Liquid Crystal Compound 1

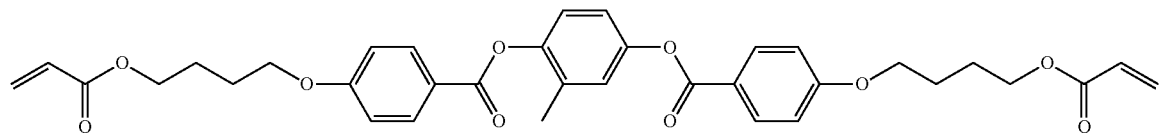 [SMILES: C=CC(=O)OCCCCOc1ccc(C(=O)Oc2ccc(OC(=O)c3ccc(OCCCCOC(=O)C=C)cc3)c(C)c2)cc1]

Polymerizable Liquid Crystal Compound 2

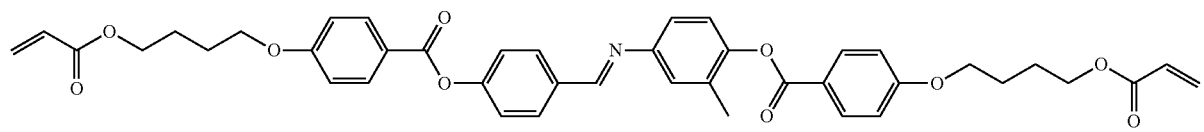

Alignment control agent: compound 3 (compound described in Japanese Patent Application Laid-Open No. 2002-80478)

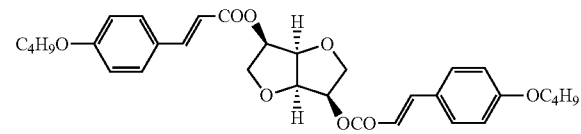

Alignment control agent: compound 4 (compound described in Japanese Patent Application Laid-Open No. 2005-999248)

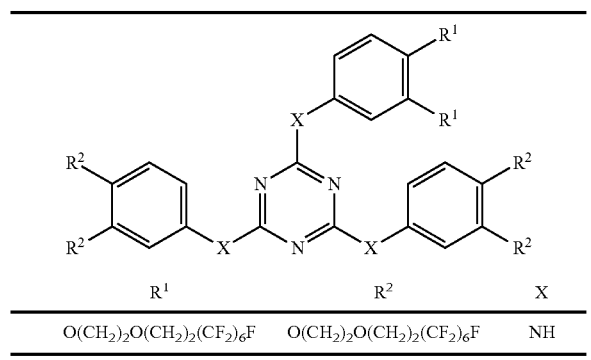

| $R^1$ | $R^2$ | X |
|---|---|---|
| $O(CH_2)_2O(CH_2)_2(CF_2)_6F$ | $O(CH_2)_2O(CH_2)_2(CF_2)_6F$ | NH |

(1) Each of prepared application liquids was applied using a wire bar at room temperature, onto a PET film having been subjected to a rubbing treatment manufactured by Fujifilm Holdings Corporation, so as to give a dry thickness of 3.5 μm. Meanwhile, Re of the PET film was 2000 nm or more.

(2) The product was dried at room temperature for 30 seconds, then heated in an atmosphere of 100° C. for 2 minutes, subsequently UV-irradiated with a D bulb (lamp: 90 mW/cm) manufactured by Fusion with an output of 60% for 6 to 12 seconds at 30° C. to thereby fix a cholesteric liquid crystalline phase. Thus, a circularly polarized light reflection film was produced.

(3) After cooling the film to room temperature, the above-described processes (1) and (2) were additionally repeated for the surface of the coated film.

By the above-described methods, each of polarization-state control members and polarized light reflection films show in Table 2 below was produced.

TABLE 2

| | Polarization-state control member and circularly polarized light reflection member of cholesteric liquid crystalline structure | | | | | |
|---|---|---|---|---|---|---|
| Lamination | Polarization-state control member 1 | Polarization-state control member 2 | Polarization-state control member 3 | Circularly polarized light reflection member 1 | Circularly polarized light reflection member 2 | Circularly polarized light reflection member 3 |
| 1st layer | E | E | C | A | A | A |
| 2nd layer | F | F | D | B | B | B |
| 3rd layer | Absent | G | E | Absent | C | C |
| 4th layer | Absent | H | F | Absent | D | D |
| 5th layer | Absent | Absent | Absent | Absent | Absent | E |
| 6th layer | Absent | Absent | Absent | Absent | Absent | F |
| 7th layer | Absent | Absent | Absent | Absent | Absent | G |
| 8th layer | Absent | Absent | Absent | Absent | Absent | H |

Production of a Polarization-State Control Member 4 and the Circularly Polarized Light-Reflecting Member 4 Each Including a Linearly Polarizing Reflection Plate and a Quarter Wave Plate, and a Circularly Polarized Light-Reflecting Member 5 Including a Reflection Plate and a Quarter Wave Plate A reflection polarizer (DBEF, manufactured by 3M) having a polymer multi-film structure as a linearly polarizing reflection plate and a quarter wave plate (trade name Pureace, manufactured by Teijin Limited) were pasted so that the angle between the transmission axis of the polarizer and the slow axis of the quarter wave plate was 45 degrees to thereby produce a polarization-state control member 4. The polarization-state control member transmits selectively right-circularly polarized light.

Subsequently, the same members were used and pasted so that the angle between the transmission axis of the polarizer and the slow axis of the quarter wave plate was 45 degrees again but in the opposite direction to thereby produce the circularly polarized light-reflecting member 4. Subsequently, a reflection film produced by evaporating aluminum on a PET base was used as a reflection plate, which was pasted with a quarter wave plate (trade name Pureace, manufactured by Teijin Limited) using a commercially available agglutinant to thereby produce a circularly polarized light-reflecting member 5.

—Production of a System—

Subsequently, these polarization-state control members were disposed on an emission face of a commercially available white LED lamp (PAR30, manufactured by Beautiful Light Technology Corporation) in combinations as described in Table 3, and were used in the position 4 shown in FIG. 1. The polarization-state control member was disposed such that the cholesteric liquid crystal layer in the case of the cholesteric liquid crystal structure, or the quarter wave plate in the case of the laminate of the linearly polarizing reflection plate or the reflection plate and the quarter wave plate, faced the inside of a vessel (lay on the outer side relative to the lamp face). Furthermore, a rectangular parallelepiped vessel of 30 cm in lateral width and in depth, respectively, and 35 cm in height with an opened upper face was formed from an acrylic plate. As to the color of the vessel, white one and black one were prepared. Each whole face of five inner faces of the vessel excluding the upper face was coved with the polarized light reflection member shown in Table 3. In the covering, the reflection member was disposed such that the cholesteric liquid crystal layer was inside the vessel when the circularly polarized light-reflecting member was the cholesteric liquid crystal structure, and that the quarter wave plate was inside the the vessel when the circularly polarized light-reflecting member was a laminate of the linearly polarizing reflection plate or the reflection plate, and the quarter wave plate.

Furthermore, the above-described LED lamp was disposed on the upper opened face side of the vessel. The illuminance at the vessel bottom face was measured using an illuminance meter (T-1H, manufactured by Minolta, Inc.). The circular polarization degree at the vessel bottom was measured with a spectrophotometer (model number: USB2000, manufactured by Ocean Optics) mounted with a circularly-polarizing plate at a wavelength of 550 nm plural times while varying the incident angle of light, and the average value thereof was calculated. Using the above-described system, basil, a kind of herb was cultivated under environmental condition of 25° C. for 38 days, and after that, the weight was measured.

Measurement results are shown in Table 3. In Example and Comparative Examples 1 and 2, the circularly polarized light was right-circularly polarized light selective.

TABLE 3

|  | Example 1 | Example 2 | Example 3 | Example 4 | Example 5 | Example 6 | Example 7 |
| --- | --- | --- | --- | --- | --- | --- | --- |
| Light source | LED | LED | LED | LED | I Fn | LED | LED |
| Polarization-state control member | Polarization-state control | Polarization-state control | Polarization-state control | Polarization-state control | Polarization-state control | Polarization-state control | Polarization-state control |
| Circularly polarized light-reflecting member on wall, floor | Circularly polarized light reflection member 1 | Circularly polarized light reflection member 2 | Circularly polarized light reflection member 3 | Circularly polarized light reflection member 5 | Circularly polarized light reflection member 5 | Circularly polarized light reflection member 5 | Circularly polarized light reflection member 2 |
| Color of vessel inner face | White | White | White | White | White | White | White |
| Illuminance at vessel bottom/lx | 27000 | 26000 | 26000 | 25500 | 25000 | 25000 | 26000 |
| Degree of circularly polarized light at vessel bottom | 0.9 | 0.9 | 0.9 | 0.9 | 0.9 | 0.9 | 0.9 |
| Basil weight ratio | 100 | 96 | 100 | 95 | 93 | 96 | 96 |

|  | Example 8 | Example 9 | Example 10 | Comparative Example 1 | Comparative Example 2 | Comparative Example 3 |
| --- | --- | --- | --- | --- | --- | --- |
| Light source | LED | LED | LED | LED | LED | LED |
| Polarization-state control member | Polarization-state control | Polarization-state control | Absent | Polarization-state control | Polarization-state control | Absent |
| Circularly polarized light-reflecting member on wall, floor | Circularly polarized light reflection member 5 | Circularly polarized light reflection member 4 | Circularly polarized light reflection member 2 | Absent | Absent | Absent |
| Color of vessel inner face | White | White | Black paper | White | Black paper | White |

TABLE 3-continued

| | | | | | | |
|---|---|---|---|---|---|---|
| Illuminance at vessel bottom/lx | 25000 | 25000 | 23000 | 26500 | 11000 | 30000 |
| Degree of circularly polarized light at vessel bottom | 0.9 | 0.9 | 0.55 | 0.3 | 0.85 | 0 |
| Basil weight ratio | 92 | 92 | 73 | 67 | 45 | 59 |

While the present invention has been described in detail and with reference to specific embodiments thereof, it will be apparent to one skilled in the art that various changes and modifications can be made therein without departing from the spirit and scope thereof. All the publications referred to in the present specification are expressly incorporated herein by reference in their entirety. The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

KEY TO THE NUMBERS

1: housing
2: reflection face (reflection film)
3: light source
4: polarization-state control member
5: protective plate

The invention claimed is:

1. A system for irradiating a target object selectively with circularly polarized light in one sense, comprising a polarization-state control member that controls the polarization state of light to thereby generate circularly polarized light, and a circularly polarized light-reflecting member, wherein
the circularly polarized light-reflecting member is disposed at a position on which the circularly polarized light emitted from the polarization-state control member can be incident;
the circularly polarized light-reflecting member generates reflected light that comprises circularly polarized light of the same sense as the incident circularly polarized light from the polarization-state control member; and
the circularly polarized light-reflecting member is disposed such that the target object can be irradiated with the reflected light circularly polarized only in one sense.

2. The system according to claim 1 used as a structure, wherein the structure comprises a space containing the polarization-state control member and the circularly polarized light-reflecting member; the space is formed by faces having the circularly polarized light-reflecting member at least in part; and 10% or more of the area of the faces forming the space has the circularly polarized light-reflecting member.

3. The system according to claim 2, including the circularly polarized light-reflecting member in 50% or more of the area of the faces forming the space.

4. The system according to claim 3 used as a plant factory, wherein the plant factory comprises a space formed by a wall face, a ceiling and a floor, and comprises the polarization-state control member and the circularly polarized light-reflecting member inside the space; and 10% or more of the total area of the wall face, the ceiling and the floor is the circularly polarized light-reflecting member.

5. The system according to claim 2, wherein the circularly polarized light-reflecting member is disposed at a position on which the circularly polarized light produced by passing through the polarization-state control member can be incident.

6. The system according to claim 5 used as a plant factory, wherein the plant factory comprises a space formed by a wall face, a ceiling and a floor, and comprises the polarization-state control member and the circularly polarized light-reflecting member inside the space; and 10% or more of the total area of the wall face, the ceiling and the floor is the circularly polarized light-reflecting member.

7. The system according to claim 1, wherein the polarization-state control member comprises a linearly-polarizing plate and a quarter wave plate.

8. The system according to claim 7 used as a plant factory, wherein the plant factory comprises a space formed by a wall face, a ceiling and a floor, and comprises the polarization-state control member and the circularly polarized light-reflecting member inside the space; and 10% or more of the total area of the wall face, the ceiling and the floor is the circularly polarized light-reflecting member.

9. The system according to claim 1, wherein the polarization-state control member comprises a layer having a helical molecular arrangement structure.

10. The system according to claim 9, wherein the circularly polarized light-reflecting member comprises a layer having a helical molecular arrangement structure.

11. The system according to claim 9 used as a plant factory, wherein the plant factory comprises a space formed by a wall face, a ceiling and a floor, and comprises the polarization-state control member and the circularly polarized light-reflecting member inside the space; and 10% or more of the total area of the wall face, the ceiling and the floor is the circularly polarized light-reflecting member.

12. The system according to claim 10 used as a plant factory, wherein the plant factory comprises a space formed by a wall face, a ceiling and a floor, and comprises the polarization-state control member and the circularly polarized light-reflecting member inside the space; and 10% or more of the total area of the wall face, the ceiling and the floor is the circularly polarized light-reflecting member.

13. The system according to claim 1, wherein the target object is a plant.

14. The system according to claim 1, wherein the system has a light source; and the polarization-state control member controls the polarization state of light generated from the light source to thereby produce circularly polarized light.

15. The system according to claim 14 used as a plant factory, wherein the plant factory comprises a shelf of 2 or more stages; a space between a bottom face and a bottom face of an upper stage in at least one stage of the shelf comprises the light source, the polarization-state control member and the circularly polarized light-reflecting member; and 10% or more of the total area of either one or more faces on the space side selected from the bottom face and the bottom face of an upper stage is the circularly polarized light-reflecting member.

16. The system according to claim 15, wherein the polarization-state control member comprises a linearly-polarizing plate and a quarter wave plate.

17. The system according to claim 15, wherein the polarization-state control member comprises a layer having a helical molecular arrangement structure.

18. The system according to claim 17, wherein the circularly polarized light-reflecting member comprises a layer having a helical molecular arrangement structure.

19. The system according to claim 1 used as a plant factory, wherein the plant factory comprises a space formed by a wall face, a ceiling and a floor, and comprises the polarization-state control member and the circularly polarized light-reflecting member inside the space; and 10% or more of the total area of the wall face, the ceiling and the floor is the circularly polarized light-reflecting member.

20. A method for cultivating a plant using the system according to claim 1.

* * * * *